(12) United States Patent
Nakama et al.

(10) Patent No.: US 6,816,646 B2
(45) Date of Patent: Nov. 9, 2004

(54) LIGHT-SENSITIVE DETECTOR AND OPTICAL DEMULTIPLEXER

(75) Inventors: Kenichi Nakama, Osaka (JP); Hisao Nagata, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 383 days.

(21) Appl. No.: 10/024,510

(22) Filed: Dec. 21, 2001

(65) Prior Publication Data

US 2002/0085809 A1 Jul. 4, 2002

(30) Foreign Application Priority Data

Dec. 26, 2000 (JP) ........................................ 2000-394406

(51) Int. Cl.[7] ................................................. G02B 6/34
(52) U.S. Cl. ............................ 385/37; 385/24; 385/33; 385/88; 385/90
(58) Field of Search ............................ 385/24, 31, 33, 385/37, 88–94

(56) References Cited

U.S. PATENT DOCUMENTS

| | | | |
|---|---|---|---|
| 5,298,742 A | | 3/1994 | Friauf |
| 5,446,290 A | | 8/1995 | Fujieda et al. |
| 6,011,884 A | * | 1/2000 | Dueck et al. .................. 385/24 |
| 6,037,655 A | | 3/2000 | Philbrick et al. |
| 6,307,657 B1 | * | 10/2001 | Ford .............................. 398/9 |
| 6,563,976 B1 | * | 5/2003 | Grann et al. .................. 385/24 |
| 6,657,723 B2 | * | 12/2003 | Cohen et al. ................ 356/328 |
| 6,661,818 B1 | * | 12/2003 | Feldman et al. .............. 372/32 |
| 6,690,002 B2 | | 2/2004 | Kuroda et al. |
| 2002/0044359 A1 | | 4/2002 | Shimmo et al. |
| 2004/0033026 A1 | * | 2/2004 | Zhu et al. ..................... 385/52 |

FOREIGN PATENT DOCUMENTS

| | | |
|---|---|---|
| EP | 0 982 615 A1 | 11/1999 |
| WO | WO99/46629 | 9/1999 |
| WO | WO 99/48829 | 9/1999 |

* cited by examiner

Primary Examiner—Hemang Sanghavi
(74) Attorney, Agent, or Firm—Whitham, Curtis & Christofferson, P.C.

(57) ABSTRACT

A light-sensitive detector (1) according to the present invention is constituted by an array (11) of photodetectors, a package (13) on which the array (11) of photodetectors is mounted, and a light-transmissible window (12) for making detection light incident on light-receiving surfaces of the photodetectors. The package (13) is provided with an aperture (14) which is formed in a position adjacent to the photodetectors so that light rays substantially parallel to the detection light can pass through the aperture (14).

14 Claims, 8 Drawing Sheets

LIGHT-SENSITIVE DETECTOR AND OPTICAL DEMULTIPLEXER

BACKGROUND OF THE INVENTION

The present invention relates to a light-sensitive detector chiefly used for wavelength multiplexing of optical communication, and an optical demultiplexer using the light-sensitive detector.

Examples of a diffraction grating used as an optically demultiplexing element include: a planar or concave diffraction grating; a wave guide diffraction grating using an arrayed wave guide (AWG); a Bragg diffraction grating having a refractive index periodic structure provided in a fiber itself; and so on. Particularly, an optical demultiplexer using a reflection type planar or concave diffraction grating to constitute a space-optical system is used widely in an optical spectrum analyzer, a monochromater, and so on.

In the field of optical communication, an optically demultiplexing element is required for demultiplexing a wavelength-multiplexed optical signal propagated in an optical fiber in dense wavelength division multiplexing (DWDM) communication, so that a diffraction grating is used widely. There has been proposed an optical demultiplexer in which a wavelength-multiplexed optical signal propagated in an optical fiber is demultiplexed by a diffraction grating an light with each wavelength (channel) is made incident on a corresponding photodetector so that the quantity of light in each channel is monitored (for example, republished Patent WO99146629). In the optical demultiplexer used for monitoring the quantity of light with each or wavelengths demultiplexed as described above, photo detected is performed by a photodetector array.

FIG. 8 shows an example of the configuration of the optical demultiplexer. In FIG. 8, the optical demultiplexer is constituted by an optical fiber 4, a collimator lens 2, a planar diffraction grating 3, and a photodetector array 11. The photodetector array 11 includes a plurality of photodetectors 10 which are arranged for performing photoelectric conversion individually, and the photodetector array 11 is generally formed on a common semiconductor substrate and constituted by one semiconductor chip. From the point of view to maintain long-term reliability and facilitate handling properties, this chip is generally used in a state of being mounted on a package such as a CAN package or a DIP package (dual-in-line package).

Here, a total body including the photodetectors 10 or the array 11 thereof and the package 13 for mounting the photodetectors 10 or the array 11 thereon is called "light-sensitive detector 1". The light-sensitive detector 1 has a light-transmissible window 12 in a surface opposite to the light-receiving surface of the photodetector array 11 so that the light-transmissible window 12 serves as means through which light entering the respective photodetectors 10 passes. Incidentally, the light-sensitive detector 1 needs to further have an electric wiring means for taking the photoelectrically converted electric signal to the outside. The electric wiring means includes lead frames and pins (terminals) generally embedded in the package, and bonding wires for connecting the respective photodetectors to the lead frames and pins. The electric wiring means is, however, omitted in FIG. 8.

Incident light 51 from the optical fiber 4 diverges in accordance with the numerical aperture of the optical fiber and is converted into collimated light 52 by the collimator lens 2. The collimated light 52 is made incident on the planar diffraction grating 3. The diffracted light 53 demultiplexed into channels in accordance with the wavelengths by the planar diffraction grating 3 passes through the collimator lens 2 again and is converted into converged light 54. As a result, light is condensed onto the light-receiving surfaces of the photodetectors 10, so that photoelectric conversion is performed.

In the optical demultiplexer configured as described above, the collimator lens 2 can play a role of collimating the light 51 diverged from the optical fiber 4 and a role of condensing the light 53 diffracted by the diffraction grating 3 onto the light-receiving surfaces of the photodetectors 10. Hence, the optical demultiplexer configured thus has a feature that the number of constituent parts is small. Moreover, in order to obtain an optical system which is high in diffraction efficiency and low in cost and has good stability against temperature, the optical fiber 4 and the light-sensitive detector 1 are mounted in the form of mounting near to so-called Littrow mounting in which the optical fiber 4 and the light-sensitive detector 1 are put as close to each other as possible so that the angle of light incident on the diffraction grating 3 is substantially equal to the angle or light made to exit from the diffraction grating 3.

The aforementioned background-art technique, however, has a problem in giving a serious influence on optical characteristic. That is, the light-sensitive detector 1 has the photodetector array 11 mounted in the inside of the package 13 having a finite size. Hence, even in the case where the optical fiber 4 and the photodetector array 11 are intended to be provided in the form of ideal Littrow mounting, the package 13 becomes a hindrance to the intention so that the distance between the mounted optical fiber 4 and the mounted light-sensitive detector 1 cannot be reduced any more than a predetermined value.

In such a case, a problem in optical characteristic occurs as follows. Light rays from the collimator lens 2 toward the diffraction grating 3 and light rays diffracted toward the light-sensitive detector 1 by the diffraction grating 3 are abaxial light rays viewed from the collimator lens 2. Hence, such light rays are influenced by abaxial aberration of the collimator lens 2, that is, coma aberration, astigmatism, and so on. As a result, the shape of a spot condensing into each of the photodetectors 10 may be enlarged or deformed so that efficiency of condensing the light onto the light-receiving surface of the photodetector 10 is lowered. In addition, in the photodetector array, there may arise a problem that crosstalk among the respective photodetectors (channels) is worsened.

As a measure to solve the above-mentioned problems, the package 13 may be removed so that the photodetector array 11 is treated as the semiconductor chip. However, if it is arranged so, a problem in reliability occurs so that a steady operation for a long term cannot be guaranteed. In addition, in a state in which the semiconductor chip is exposed to the outside, difficulty to handle the semiconductor chip increases when the optical demultiplexer is assembled.

On the other hand, measures to reduce the size of the package 13 as sufficiently as much may be conceived. From the point of view of reliability, however, a sealing structure cannot be avoided. For this reason, reduction of the size is limited.

SUMMARY OF THE INVENTION

The present invention is devised upon attention to the aforementioned problems in the background art. An object of the present invention is to provide a light-sensitive detector and an optical demultiplexer chiefly used in wavelength multiplexing of optical communication, in which the positional relation between the optical fiber and the photodetector array to be mounted in the light-sensitive detector can be determined in accordance with the design of an optical system without any limitation on the shape of the light-sensitive detector package to thereby achieve ideal optical characteristic.

A light-sensitive detector according to the present invention comprises at least one photodetector, a package on which the photodetector is mounted, and light-transmissible means for making detection light incident on a light-receiving surface of the photodetector, wherein the package is provided with means which is formed in a position adjacent to the photodetector and which allows transmission of light rays substantially parallel to the detection light therethrough.

The means for allowing transmission of light rays is a light-transmissible window which is constituted by an aperture formed in a part of the package made of an opaque member and which is sealed with a light-transmissible member. Alternatively, at least one part of the package may be made of a light-transmissible member. In addition, the package and the light-transmissible means for making the detection light incident on the light-receiving surface of the photodetector may be integrally molded as a light-transmissible member.

This light-sensitive detector may be used in connection not only with multiplexed light but also with non-multiplexed light.

An optical demultiplexer according to the present invention is constituted by an optical system in which incident light containing a plurality of wavelengths is made incident on a diffraction grating so that light demultiplexed by the diffraction grating is made to enter a light-sensitive detector having a plurality of photodetectors mounted therein. The light-sensitive detector used here includes photodetectors, a package on which the photodetectors are mounted, and light-transmissible means for making the demultiplexed light incident on light-receiving surfaces of the photodetectors, wherein the package is provided with means formed in a position adjacent to the photodetectors for allowing transmission of incident light entering the photodetectors so that light is made incident on the diffraction grating through the means for allowing transmission of the incident light.

The means for allowing transmission of the incident light is a light-transmissible window constituted by an aperture which is formed in a part of the package made of an opaque member and which is sealed with a light-transmissible member. Alternatively, at least one part of the package may be made of a light-transmissible member. When an end surface of an optical fiber is mounted near to the means for allowing transmission of the incident light, the incident light can be supplied easily.

The present disclosure relates to the subject matter contained in Japanese patent application No. 2000-394406 (filed on Dec. 26, 2000), which is expressly incorporated herein by reference in its entirety.

DESCRIPTION OF THE PREFERRED EMBODIMENT

Figure 1:
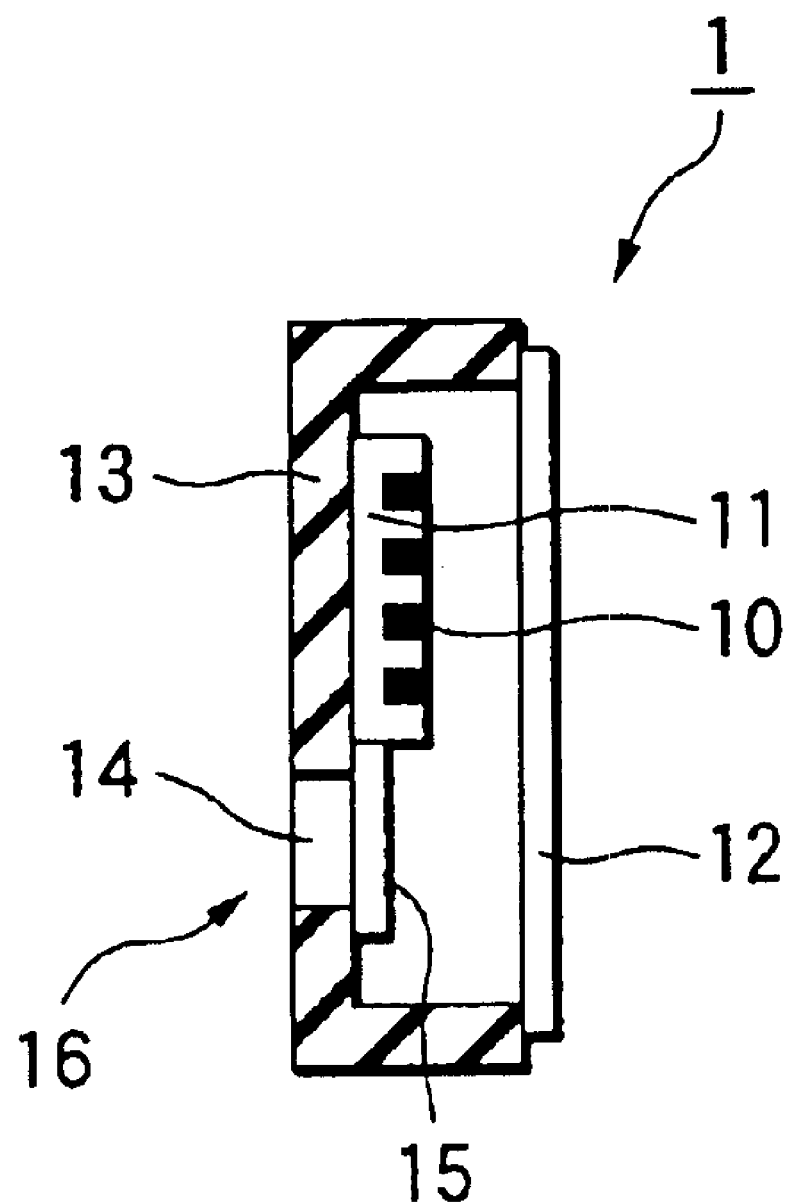
FIG. 1 is a sectional view showing a basic structure of a light-sensitive detector according to the present invention.

FIG. 1 shows an embodiment of the light-sensitive detector according to the present invention.

In this embodiment, the light-sensitive detector 1 comprises a photodetector array 11, a package 13 which is made of an opaque member in the same manner as in the background art and into which the photodetector array 11 is bonded and mounted, and a first light-transmissible window 12 disposed in a position opposite to the photodetector array 11 so that the first light-transmissible window 12 serves as means through which detection light entering the respective photodetectors 10 are transmitted. Incidentally, an electric wiring means is not shown in FIG. 1.

The light-sensitive detector 1 according to the present invention has a feature that an aperture 14 is formed in a position of the opaque package 13 adjacent to the photodetector array 11. This aperture 14 is sealed with a light-transmissible member 15 in order to seal and mount the photodetector array 11, so that the aperture 14 functions as a second light-transmissible window 16.

When light rays substantially parallel to the light rays detected by the light-sensitive detector 1 irradiate the pack 13 from the rear surface of the package 13, the light rays are first transmitted through the second light-transmissible window 16 so that the light rays once come into the inside of the light-sensitive detector 1 and go to the outside through the first light-transmissible window 12. That is, light rays which are generally ought to be blocked by the light-sensitive detector package can be transmitted through the package. When, for example, the transmitted light is reflected by a reflection means placed in front of the light-sensitive detector, the light can be transmitted through the light-transmissible window 12 so as to be made to enter the light-sensitive detector 1 again. In such an optical system, respective constituent members can be mounted so that incident light an the rear surface of the light-sensitive detector can be moved in an approximately inverse course so as to be detected.

Hence, in accordance with the present invention, the position where light enters the photodetectors 10 can be selected in an approximately optimal state based on the optical design without imposing any limitation on the structure and size of the package 13 of the light-sensitive detector. Collimated light propagated in spaces, converged lights diverged light, light made to exit from the end surface of the optical fiber or the like, is used as the incident light. Light shaped into a desired intensity distribution, a desired angle distribution or a desired space distribution by pinholes, optical devices, or the like, which are placed near the aperture 14 can be selected desirably in accordance with the optical design.

Figure 2:
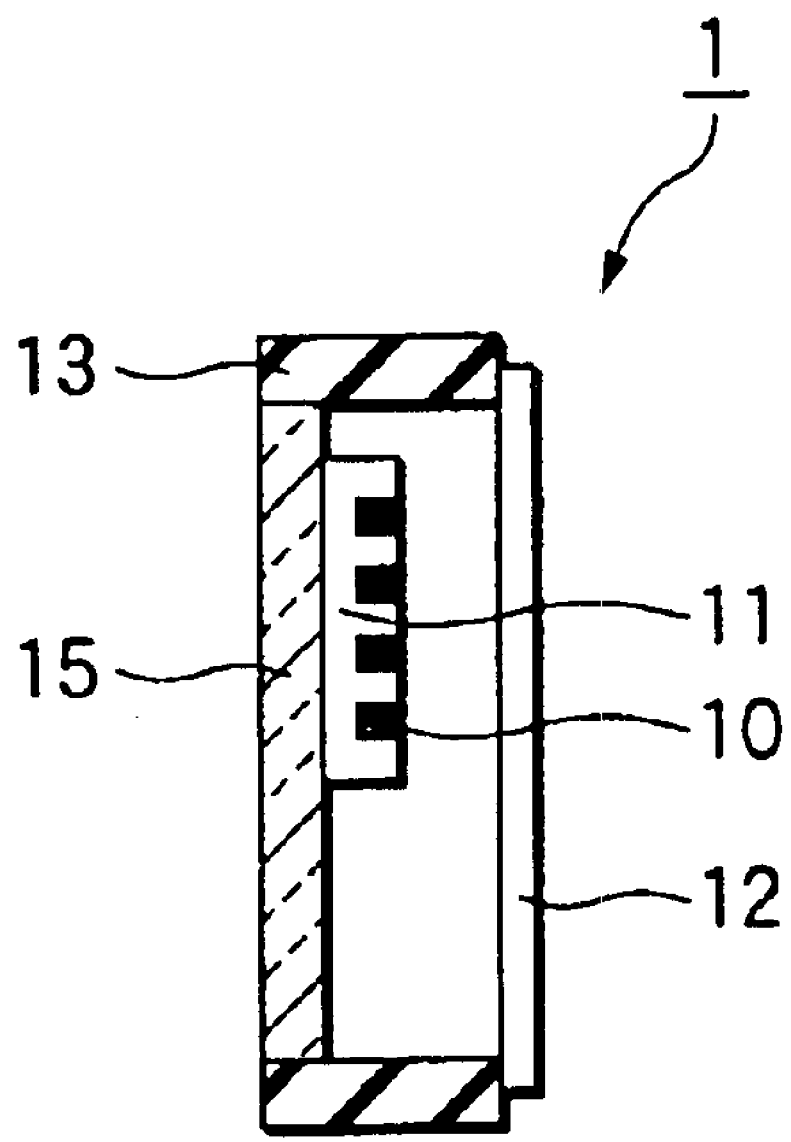
FIG. 2 is a sectional view showing another basic structure of the light-sensitive detector according to the present invention.

The size of the aperture 14 can be selected arbitrarily so long as the size can be allowed by the size of the package 13. For example, the aperture 14 may be made very small like a pinhole which has a size as small as the core diameter of the optical fiber 4. Conversely, as shown in FIG. 2, the aperture 14 may be made very large so that the whole of the bottom portion of the package 13 is substantially made of the light-transmissible member 15 and the photodetector array 11 is mounted thereon. In this case, there is an advantage in that the degree of freedom in the position of incident light can be made high because light can be transmitted in a relatively wide range of the package except the portion where light is blocked by the chip of the photodetector array and electric wiring. In any case, it is important that the light-transmissible means is provided so that light can be transmitted through a position adjacent to the photodetector array 11 in the light-sensitive detector 1.

Any material may be used as the light-transmissible member if the material can transmits light with the used wavelength. When, for example, the light-transmissible member is provided for infrared light with a wavelength of 1310 nm or 1550 nm used in optical communication, a glass material such as quartz glass, pyrex, zerodure, BK7, tempax, 7059, 1735 or sapphire glass; a semiconductor material such as silicon; a resin material such as acryl, polycarbonate or silicone, and so on, can be used as the light-transmissible member.

Any material may be used as the medium of the space sealed with the package 13 and the light-transmissible windows 12 and 16 if the material can transmit light with the used wavelength. Although a gas such as air, nitrogen or argon is generally used, as the material, a liquid such as matching oil, pure water or grease; a resin used for adhesion, sealing, press-molding or injection-molding such as silicone, epoxy, or acryl, and so on, may be used to fill the space.

Figure 3:
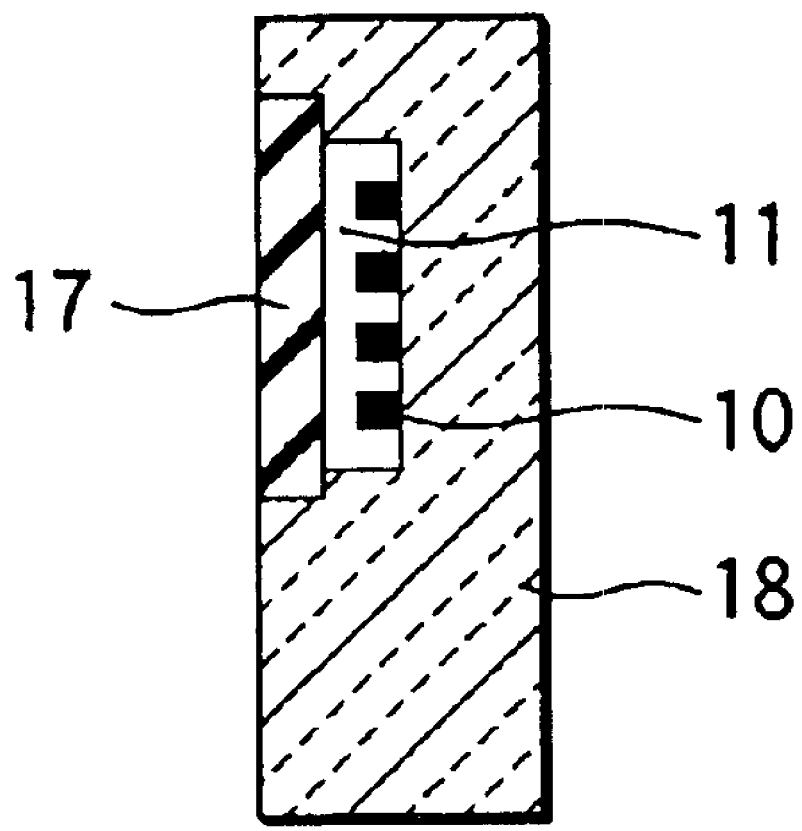
FIG. 3 is a sectional view showing a further basic structure of the light-sensitive detector according to the present invention.

Also from the point of view to prevent reflection loss in the interface, a structure in which the material of the light-transmissible member is selected to be the same as that of the space medium in the light-sensitive detector is preferable. As shown in FIG. 3, the photodetectors 10 or the photodetector array 11 is mounted on a mount carrier 17 and wiring (not shown) is provided in the mount carrier 17 for loading out an electric output. In this case, the above-mentioned preferable structure can be achieved by a light-transmissible molded article 18 which is wholly sealed with the aforementioned light-transmissible resin or the like.

When the material of the light-transmissible member is different from that of the space medium, an anti-reflection film is preferably applied to tho interface in order to reduce reflection loss.

The areal density of the window surface is preferably selected to be not larger than one wavelength in a light-transmission area with respect to the wavelength used, so that optical characteristic is not worsened by increase in wavefront aberration owing to the transmission of light.

The external shape and material of the package 13 can be selected suitably but it is preferable that the expansion coefficient difference between the material of the package and the light-transmissible member is not larger than $30 \times 10^{-7}/°$ C. or not larger than 10% of the expansion coefficient of the light-transmissible member. It is further preferable that the material of the package is the same as that of the light-transmissible member.

Figure 4:
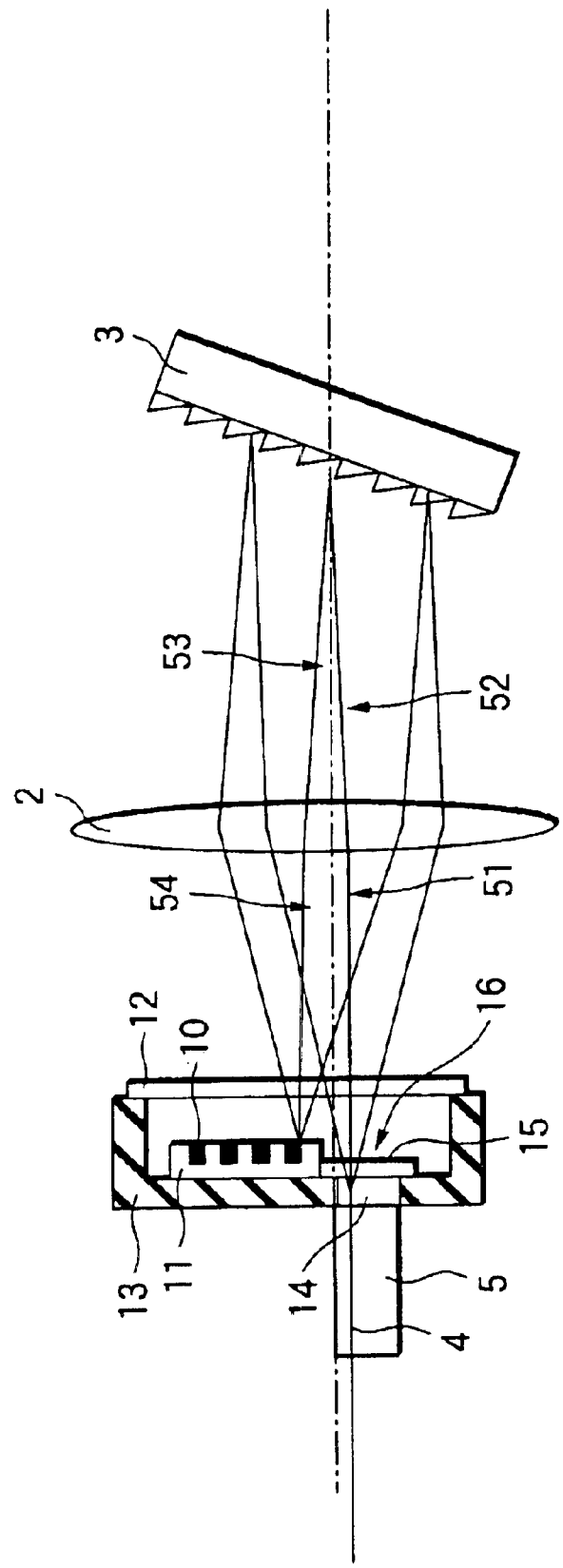
FIG. 4 is a view showing an optical system of an optical demultiplexer in the form of Littrow mounting by use of the light-sensitive detector according to the present invention.

The optical demultiplexer using the light-sensitive detector according to the present invention will be described below. FIG. 4 shows an example of the configuration of the optical demultiplexer. A single mode optical fiber 4 is used as means for making light enter the optical system. An exit end of the optical fiber 4 and the photodetector array 11 are provided in the form of Littrow mounting so as to be located in positions conjugate to each other through the collimator lens 2 and the diffraction grating 3.

Figure 5:
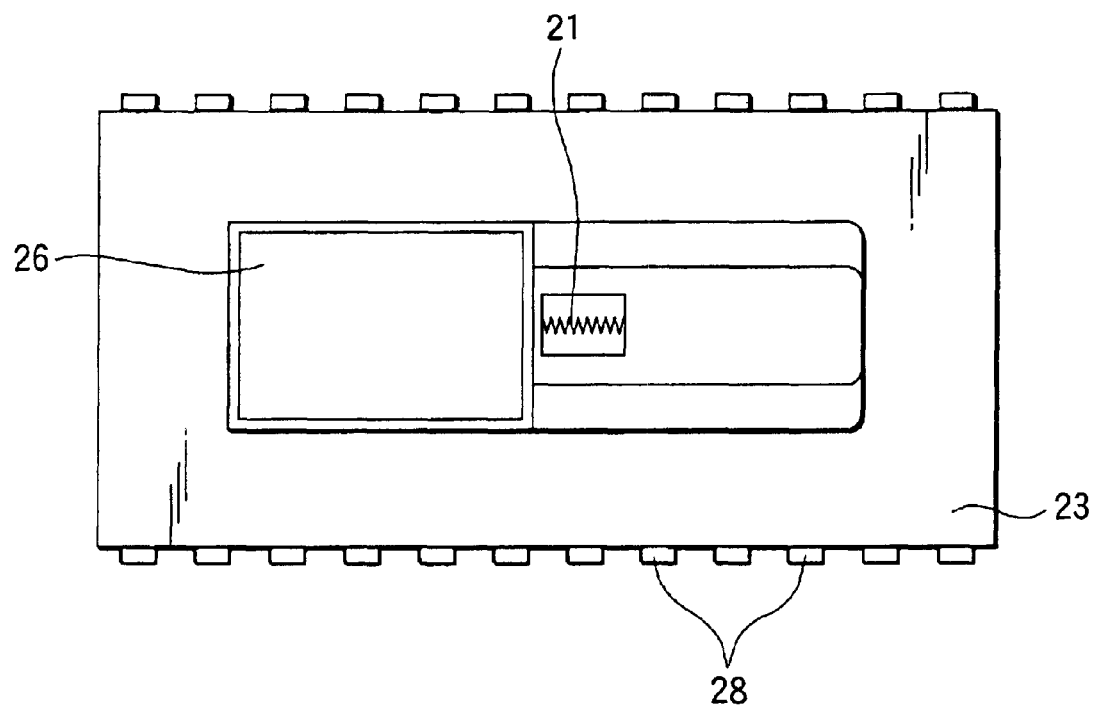
FIG. 5 is a plan view showing an embodiment of the light-sensitive detector according to the present invention.

FIG. 5 is a plan view showing a state in which the upper surface of the package of the light-sensitive detector used is removed. A DIP (dual-in-line package) type ceramic package 23 is used as the package. The package per se is opaque. The photodetector array 21 contains 22 InGasP/InP photo-detectors each of which has a light-receiving area of 30 $\mu$m×100 $\mu$m and which are arrayed linearly at intervals of 50 $\mu$m. The light-transmissible member used for the first light-transmissible window (not shown because it is provided in the upper surface of the package) on which demultiplexed light is incidents and the light-transmissible member used for the second light-transmissible window 26 through which incident light from the optimal fiber is transmitted, are both made of sapphire glass. The shortest distance between the chip end portion of the photodetector array 21 and the end portion of the second light-transmissible window 26 is selected to be about 1.9 mm. The size of the light-transmissible window is selected to be 4.9 mm×3.2 mm. The size of the effective aperture portion is selected to be 3.7 mm×2.0 mm. Lead frames of the package are respectively connected, by wire bonding, to electrodes in the upper portions of the photodetectors constituting the photodetector array 21. The connection is, however, omitted in FIG. 5. End portions of the lead frames go out of the package so as to form a plurality of connection terminals 28 (24 pins in this case). The package inside is filled with dry nitrogen and sealed.

The size of the aperture 14 in the package is selected so that a capillary for holding the optical fiber end can be inserted and fixed into the aperture 14. The focal length of the collimator lens 2 is selected to be about 50 mm. The grating constant of the diffraction grating is selected to be about 1.1 $\mu$m. With this configuration, the distance between the optical fiber 4 and each of the photodetectors can be made about 1 mm which would be an impossible value if the present invention were not used.

Figure 6:
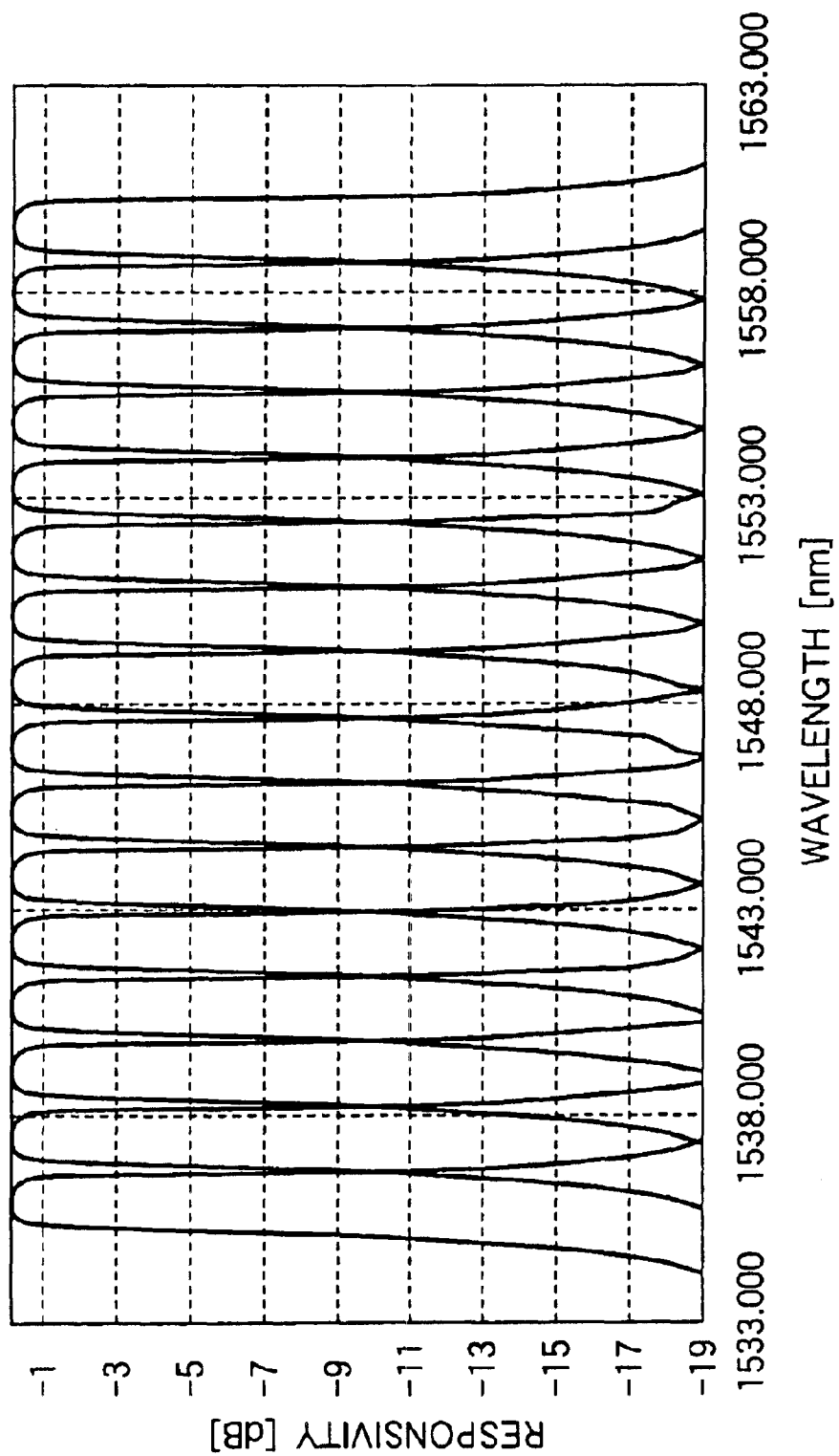
FIG. 6 is a graph showing the characteristic of the optical, demultiplexer according to the present invention.
Figure 7:
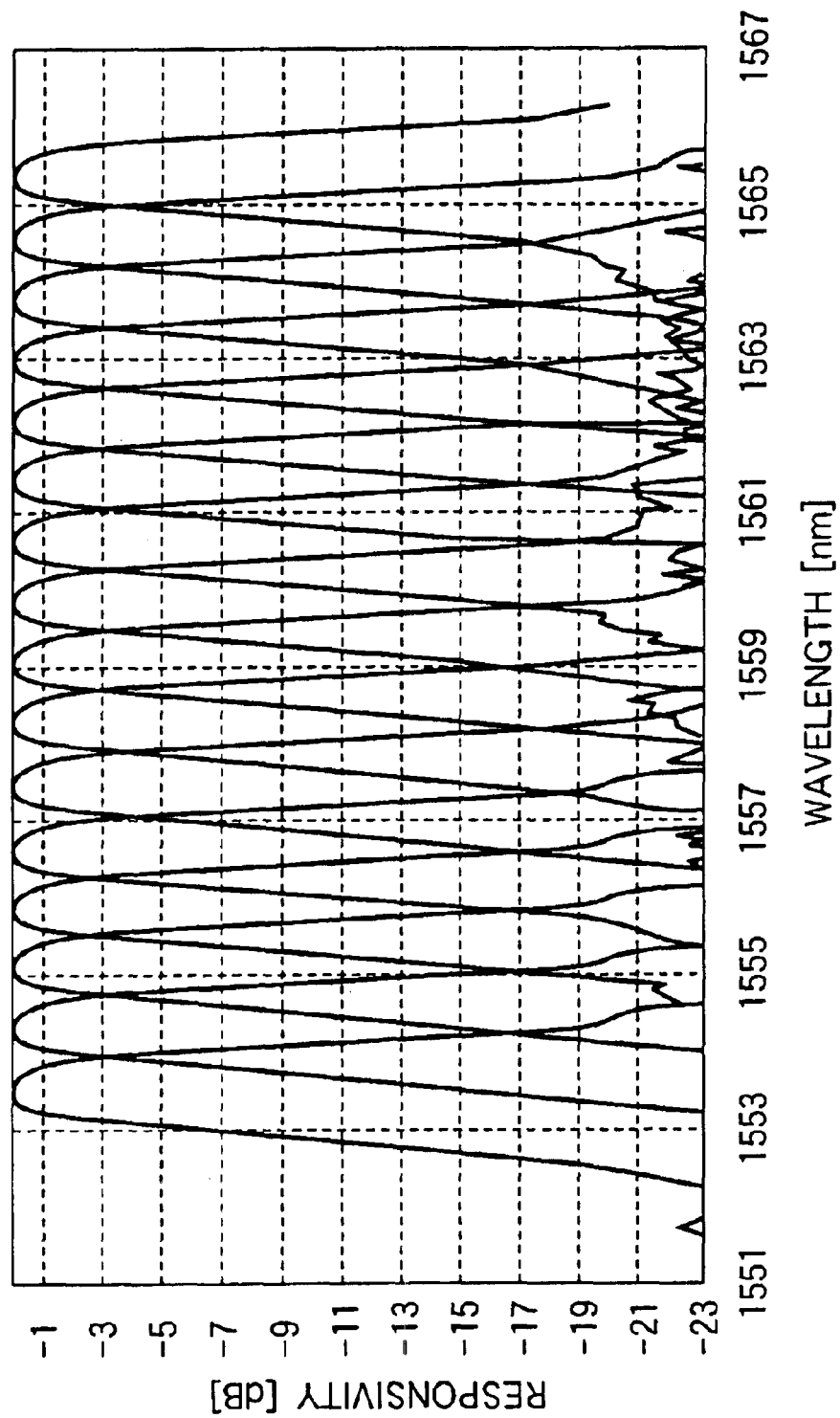
FIG. 7 is a graph showing the characteristic of a background-art optical demultiplexer.
Figure 8:
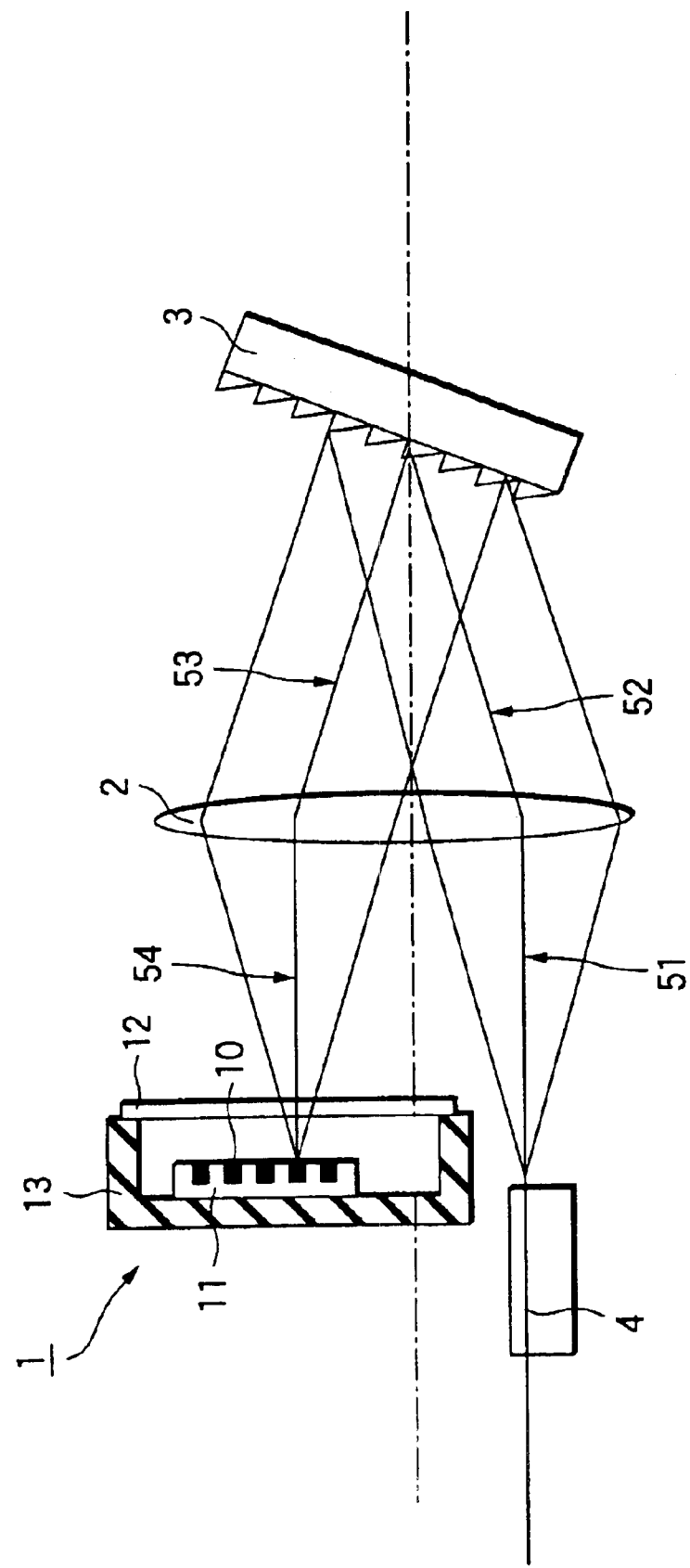
FIG. 8 is a view showing an optical system of an optical demultiplexer in the form of Littrow mounting by use of a background-art light wave detector.

FIG. 6 shows demultiplexing characteristic of the optical demultiplexer according to the present invention. FIG. 7 shows demultiplexing characteristic in the case where a background-art light-sensitive detector is used.

In the case where the background-art light-sensitive detector is used, as shown in FIG. 7, the light condensing spot is enlarged because of abaxial aberration, so that crosstalk is worsened. On the contrary, when the light-sensitive detector according to the present invention is used, as shown in FIG. 6, both crosstalk and filtering characteristic are improved, so that a good result is obtained.

Although this embodiment has shown the case where a planar diffraction grating is used as the diffraction grating 3, the collimator lens 2 and the diffraction grating 3 may be replaced by a diffraction grating formed integrally with the collimator lens on a concave circular arc.

Although the above description has been made upon an example of the configuration of the optical demultiplexer using the light-sensitive detector according to the present invention, the light-sensitive detector according to the present invention is useful for improving the degree of freedom in the design of an optical system if the apparatus using the light-sensitive detector is an optical apparatus requiring an optical system for detecting incident light while turning back the light.

As described above, in accordance with the present invention, an the assumption that light enters and exits from a light-transmissible window, optical positions of incident light from an optical fiber or space and a light-receiving surface of photodetectors can be designed desirably with being contained by a package, unlike in the general case.

Accordingly, particularly by mounting an optical fiber and photodetectors coaxially, an optical system can realize ideal performance. For example, an optical system formed in Littrow mounting by use of a diffraction grating which requires photodetectors mounted coaxially and near to an optical fiber, can be configured with suppressed abaxial aberration. As a result, ideal optical performance can be achieved inexpensively.

What is claimed is:

1. A light-sensitive detector comprising:
   a photodetector which is formed in a semiconductor chip;
   a package on which said semiconductor chip is directly mounted;
   light-transmissible means for making detection light incident on a light-receiving surface of said photodetector; and
   means, formed in said package at a position adjacent to said semiconductor chip, for allowing transmission of light rays substantially parallel to said detection light therethrough.

2. A light-sensitive detector according to claim 1, wherein said means allowing transmission of said light rays therethrough is a light-transmissible window including an aperture formed in a part of said package made of an opaque member, and a light-transmissible member sealing said aperture.

3. A light-sensitive detector according to claim 1, wherein said means allowing transmission of said light rays therethrough is a light-transmissible member which forms at least one part of said package.

4. A light-sensitive detector according to claim 1, wherein said package and said light-transmissible means for making detection light incident on said light-receiving surface of said photodetector are integrally molded as a light-transmissible member.

5. An optical demultiplexer comprising:
   a diffraction grating;
   a light-sensitive detector; and
   an optical system for making demultiplexed light containing a plurality of wavelengths incident on the diffraction grating to obtain demultiplexed light, and for making the demultiplexed light incident on a light-sensitive detector; wherein said light-sensitive detector includes:
   a plurality of photodetectors which are formed in a semiconductor chip,
   a package on which said semiconductor chip is directly mounted;
   light-transmissible means for making said demultiplexed light incident on light-receiving surfaces of said photodetectors; and
   means, formed in said package at a position adjacent to said semiconductor chip, for allowing transmission of said multiplexed light substantially parallel to said demultiplexed light so that said demultiplexed light is made incident on said diffraction grating through said means for allowing transmission of said multiplexed light.

6. An optical demultiplexer according to claim 5, wherein said means for allowing transmission of multiplexed light is a light-transmissible window including an aperture formed in a part of said package made of an opaque member, and a light-transmissible member sealing said aperture.

7. An optical demultiplexer according to claim 5, wherein said means for allowing transmission of multiplexed light is a light-transmissible member which forms at least one part of said package.

8. An optical demultiplexer according to claim 5, wherein said package and said light-transmissible means for making demultiplexed light incident on said light-receiving surfaces of said photodetectors are integrally molded as a light-transmissible member.

9. An optical demultiplexer according to claim 5, wherein said multiplexed light containing a plurality of wavelengths is supplied from an end surface of an optical fiber mounted close to said means for allowing transmission of multiplexed light.

10. A light-sensitive detector comprising:
    a package having a first side and a second side opposite from the first side;
    at least one photodetector which is formed in a semiconductor chip, and said semiconductor chip being sealingly disposed within said package;
    a light transmissible portion defining a first optical path extending from said first side to said second side, and a second optical path extending from said second side to said photodetector.

11. A light-sensitive detector according to claim 10, wherein said light transmissible portion includes an aperture formed through said first side of said package, a first light transmissible member sealing the aperture, and a second light transmissible member provided as said second side of said package.

12. A light-sensitive detector according to claim 10, wherein said light transmissible portion includes a first light transmissible member provided as said first side of said package and a second light transmissible member provided as said second side of said package.

13. A light-sensitive detector according to claim 10, wherein said light transmissible portion includes a light-transmissible resin molding the photodetector therein and forming at least a part of said package.

14. A light-sensitive detector according to claim 10, wherein said first optical path is substantially parallel to said second optical path.

* * * * *